(12) United States Patent
Chase (10) Patent No.: US 7,090,206 B2
(45) Date of Patent: Aug. 15, 2006

(54) BUMPER SYSTEM (76) Inventor: Wylie Chase, 303 Pine Creek Ct., Waterford, MI (US) 48328

( * ) Notice: Subject to any disclaimer, the term of this patent is extended or adjusted under 35 U.S.C. 154(b) by 0 days.

(21) Appl. No.: 10/766,076

(22) Filed: Jan. 28, 2004

(65) Prior Publication Data
US 2004/0183242 A1 Sep. 23, 2004

Related U.S. Application Data (60) Provisional application No. 60/443,322, filed on Jan. 29, 2003.

(51) Int. Cl.
F16M 1/00 (2006.01)

(52) U.S. Cl. ........................ 267/139; 114/219
(58) Field of Classification Search ................ 267/139; 114/219
See application file for complete search history.

(56) References Cited

U.S. PATENT DOCUMENTS

| | | | | |
|---|---|---|---|---|
| 3,359,030 A | * | 12/1967 | Newman | 293/128 |
| 3,486,342 A | | 12/1969 | Aks | 61/46 |
| 3,574,379 A | * | 4/1971 | Jordan | 293/109 |
| 3,606,432 A | | 9/1971 | Honatzis | 293/128 |
| 3,865,358 A | * | 2/1975 | Butters | 267/140 |
| 3,937,170 A | * | 2/1976 | Drewett | 114/219 |
| 4,198,919 A | * | 4/1980 | Evans et al. | 114/219 |
| 4,227,832 A | | 10/1980 | Leone et al. | 405/215 |
| 4,428,568 A | * | 1/1984 | McNatt et al. | 267/140 |
| 4,548,150 A | * | 10/1985 | Drewett | 114/219 |
| 4,641,999 A | * | 2/1987 | Korbuly | 405/215 |
| 4,773,349 A | | 9/1988 | McKinney | 114/219 |
| 5,497,723 A | | 3/1996 | Chase | 114/219 |
| 5,671,692 A | * | 9/1997 | Kimball | 114/219 |
| 5,762,016 A | * | 6/1998 | Parsons | 114/219 |
| 6,112,690 A | * | 9/2000 | Anderson | 114/220 |
| 6,196,150 B1 | * | 3/2001 | Fondacaro | 114/219 |
| 6,209,857 B1 | * | 4/2001 | Berends | 267/140 |
| 6,289,836 B1 | * | 9/2001 | Tellex | 114/219 |
| 6,364,293 B1 | * | 4/2002 | Beckett | 267/140 |
| 6,406,221 B1 | * | 6/2002 | Collier | 405/213 |
| 6,513,449 B1 | * | 2/2003 | Stewart et al. | 114/219 |
| 6,685,395 B1 | * | 2/2004 | Busby | 405/215 |

* cited by examiner

Primary Examiner—Robert A. Siconolfi
(74) Attorney, Agent, or Firm—Gifford, Krass, Groh, Sprinkle, Anderson & Citkowkski, P.C.

(57) ABSTRACT

An impact absorption device is provided having a generally cylindrically shaped impact absorption member formed of an extruded material. The exterior wall defines an interior volume and further includes a flanged portion that extends to at least one end of the absorption member. A bracket assembly is removably secured to the flanged portion of the mounting member for attaching the impact absorption device to a freestanding object such as a piling or docking post. Due to the design of the flange of the absorption member, a plurality of members may be coupled together using an appropriately designed bracket for accommodating the cover of pilings of docking posts of various lengths.

7 Claims, 7 Drawing Sheets

BUMPER SYSTEM

REFERENCE TO RELATED APPLICATION

The present application claims the benefit of U.S. provisional patent application Ser. No. 60/443,322, filed Jan. 29, 2003.

FIELD OF THE INVENTION

The present invention relates to a bumper system that has utility in protecting against damage that occurs upon colliding with a standing object and more particularly to a bumper system that protects a watercraft from damage during the docking process.

BACKGROUND OF THE INVENTION

The need for adequate protective devices for marinas and private docking areas is an increasing problem with the increasing number of pleasure boats and yachts. Various devices are known for protecting a boat from damage when the boat is secure or maneuvered alongside a dock, pier or piling. One such device is provided in U.S. Pat. No. 4,227,832 which discloses a protective device for docked boats for vertical attachment relative to support means such as a piling. The device includes a carriage means such as an elongated H-beam which is permanently fixed to the piling from the point well below the water level to a desired elevation above the water level. A protective cover, such as a cylindrical member, is provided with a T-slot along one side thereof for sliding reception of an outer T-portion of the H-beam for forming the protective device.

However, due to the means used for connecting the cylindrical member to the H-beam, the protective device of the '832 patent is potentially susceptible to tear-out whereby extensive maintenance or replacement of the protective device would be required quite frequently.

SUMMARY OF THE INVENTION

The present invention provides a bumper assembly for impact absorption including a cylindrically shaped impact absorption member formed of an extruded material having an exterior wall that defines an interior volume. The exterior wall includes a flanged portion that extends to at least one end of the impact absorption member. A plurality of elongated lobes may be formed on the exterior wall which are adapted to reduce surface friction with a contacting object. The interior volume of the impact absorption member is filled with a resilient foam or other impact absorbent material.

A mounting bracket is provided that is dimensioned to be removably secured to the flanged portion of the impact absorption member. A mounting member is disposed on the bracket for mounting the impact absorption device to a piling or other objects surrounding a boat well or docking area.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

The present invention relates to a bumper system that has utility in protecting a watercraft from damage during the docking process. However, it is appreciated that the inventive concept disclosed herein may also be used in other applications and/or environments illustratively including industrial, residential and commercial environments.

Figure 1A:
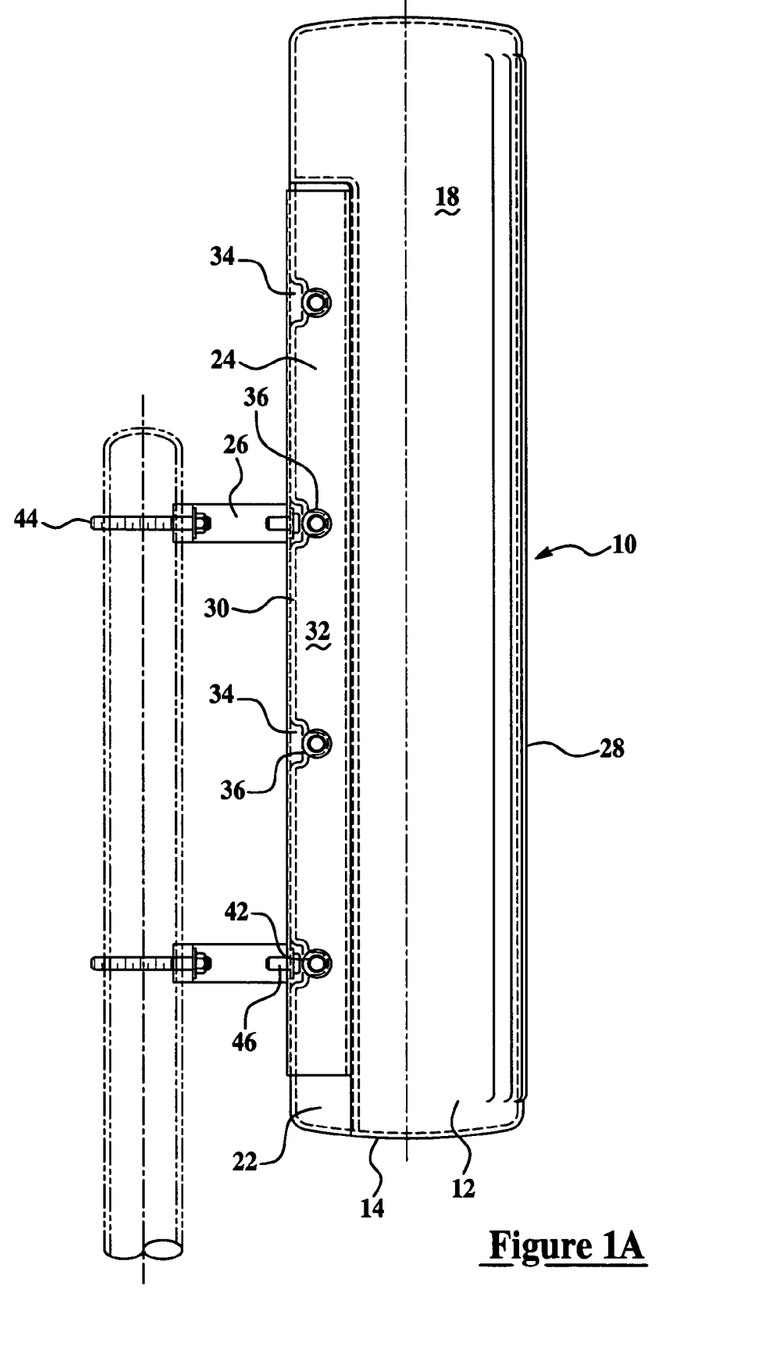
FIGS. 1A and 1B illustrate side and cross-sectional views of the inventive bumper system.
Figure 1B:
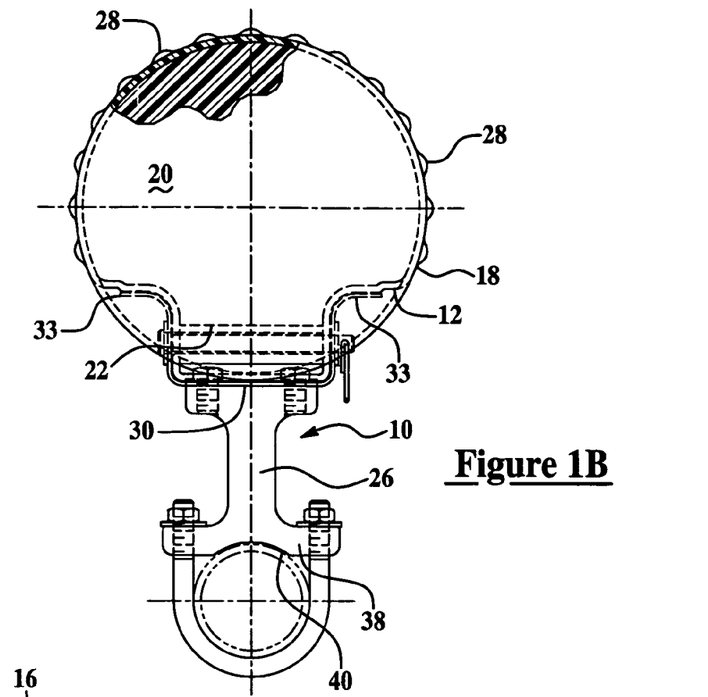
Figure 2:
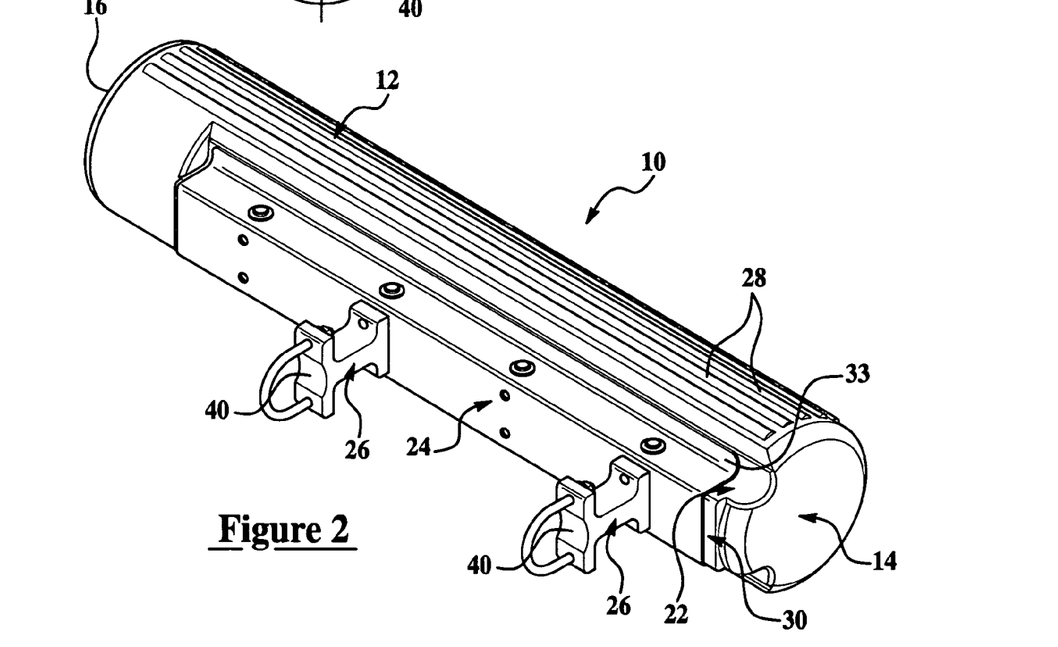
FIG. 2 illustrates a perspective view of the bumper system.
Figure 3:
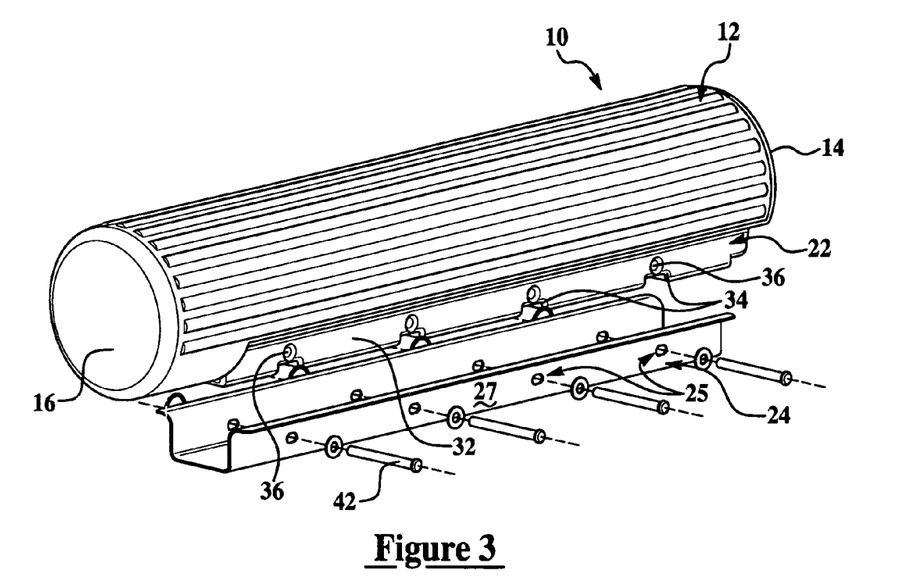
FIG. 3 illustrates an exploded view of the impact absorption member and bracket of the bumper system as according to the invention.

As generally illustrated in FIGS. 1–3, the bumper system 10 as according to the invention includes a bracket assembly and an impact absorption member 12.

The impact absorption member 12 includes opposing ends 14 and 16 and an exterior wall 18 that defines an interior volume 20. The exterior wall 18 includes a flanged portion 22 that extends to or through at least one of the opposing ends 14. Preferably, the exterior wall 18 of the absorption member 12 includes a plurality of elongated lobes 28 operative to reduce surface friction with an object that impacts the device 10.

Figure 8:
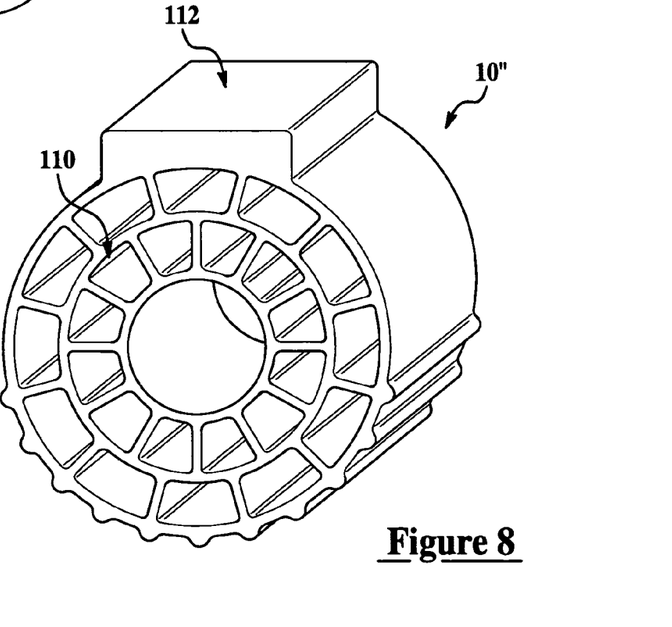
FIG. 8 is a cross sectional view of a second alternative embodiment of the bumper system.

The interior volume 20 of the impact absorption member 12 is filled with an impact absorbent material such as polyurethane foam or other resiliently durable material. The absorbent material may be injected into the impact absorption member 12 via processes known to those skilled in the art. As illustrated in a second alternative embodiment of FIG. 8, the interior volume of the impact absorption member may be formed of a web-like lattice structure which provides an impact absorbent member having a resiliency inherent to the material used to form the impact absorption member 12.

The impact absorption member 12 is formed of an extruded material such as PVC or an ultra low density polyethylene material. However, it is appreciated that other materials suitable for extrusion processes known to those skilled in the art may also be used for forming the impact absorption member 12.

Referring now to FIG. 3, the impact absorption member 12 is shown wherein the flanged portion includes a center wall or planar ridge 30 and sidewalls 32. The planar ridge 30 includes spaced apart notches 34 formed substantially perpendicular to a longitudinal axis of the impact absorption member 12. Additionally, the sidewalls 32 of the flanged portion 22 have a plurality of spaced apart apertures 36 formed therein that are substantially perpendicular to the longitudinal axis of the impact absorption member 12. The notches 34 and apertures 36 are provided for facilitating the engagement of fastening means to the impact absorption member 12 to be described hereinafter.

Referring again to FIGS. 1A–3, a bracket 24 is provided and is adapted to be removably secured to the flanged portion 22 of the impact absorption member. The bracket 24 is formed to complement the shape and contour of the flanged portion 22 of the impact absorption member and includes winglike extensions 33 that extend outward from the base of the sidewalls 32 of the flange. In this manner, the bracket 24 contacts a larger surface area of the impact absorption member 12 which provides a greater hold on the impact absorption member 12 during impact such that occurrence of tear out of the absorption member 12 may be reduced.

The bracket 24 also includes apertures 25 spaced apart along sidewalls 27 that align with the apertures 36 formed in the sidewalls 32 of the impact absorption member 12. When the bracket 24 is coupled to the impact absorption member, fasteners 42 can be received through the apertures 25 and 36 formed in the bracket and impact absorption member, respectively, for removably securing the components together.

Figure 10:
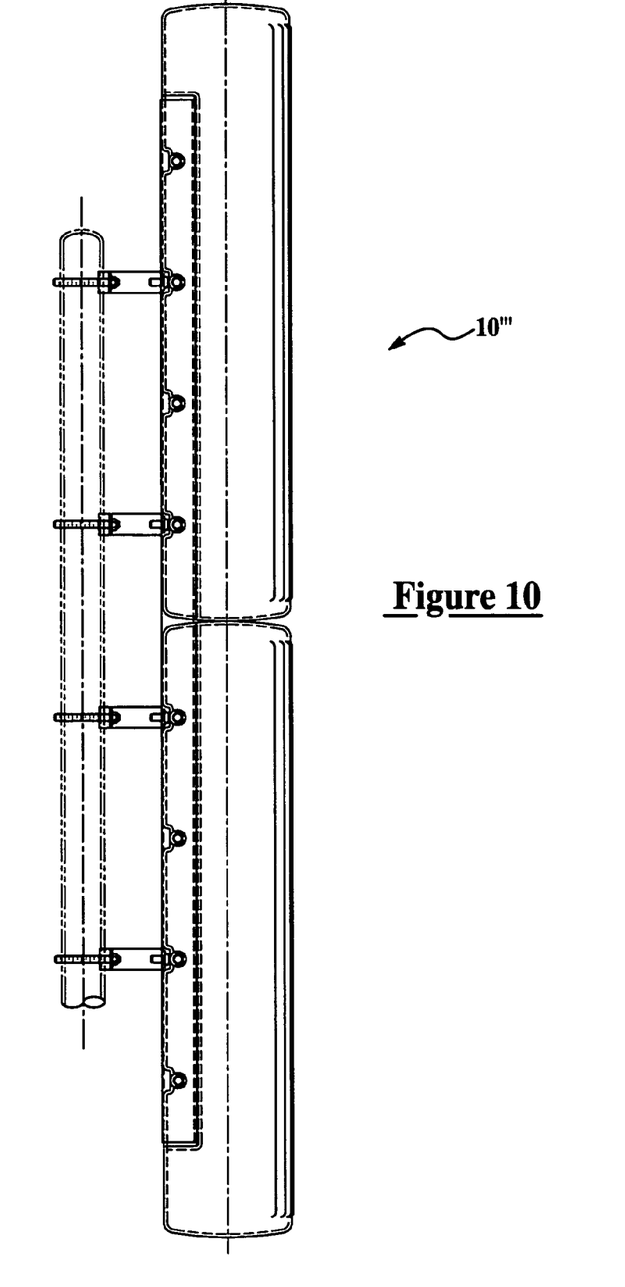
FIG. 10 illustrates a side view of a plurality of impact absorption devices joined to accommodate pilings of various lengths.

Referring now to FIG. 2, the impact absorption device 12 includes one end 14 whereby the flanged portion 22 extends thereto. It is appreciated that the flanged portion 22 may be formed to extend through both ends 14 and 16 of an impact absorption member 12 whereby a plurality of impact absorption members may be arranged end to end and coupled together with a single bracket dimensioned to cover the flanged portions of each of the impact absorption members such that pilings or docking posts of various lengths may be accommodated by the impact absorption device 10 as according to FIG. 10.

Still referring to FIG. 2, a mounting member 26 is coupled to the bracket 24 for mounting the impact absorption device to an object to be protected from direct impact such as a piling or docking post. It is appreciated that many of the pilings of docking posts are conventionally of a round cylindrical shape. Accordingly, the mounting member 26 includes an end 40 that has an indention that is complementary to the surface of the round docking post. In this manner, when the impact absorption device 10 is mounted to the docking post, the indentation 40 formed at the end of the mounting member 26 operates to provide a greater contact surface area against the surface of the docking post whereby the device 10 is made to be more resistant to movement or shifting upon impact.

Preferably, the bracket 24 and mounting member 26 are formed of a highly durable corrosive-resistant metallic material; however, it is appreciated that other materials suitable for such purpose may be utilized which illustratively include polymers and metal alloys.

Referring back to FIG. 1A, the mounting member 26 is shown to be attached to the bracket 24 at points that correspond to the notches 34 formed in the impact absorption member 12 as shown. The notches 34 are formed in the impact absorption member 12 to accommodate portions of the fasteners 46 used to join the bracket 24 to the mounting members 26 in a flush and convenient fashion.

Figure 4:
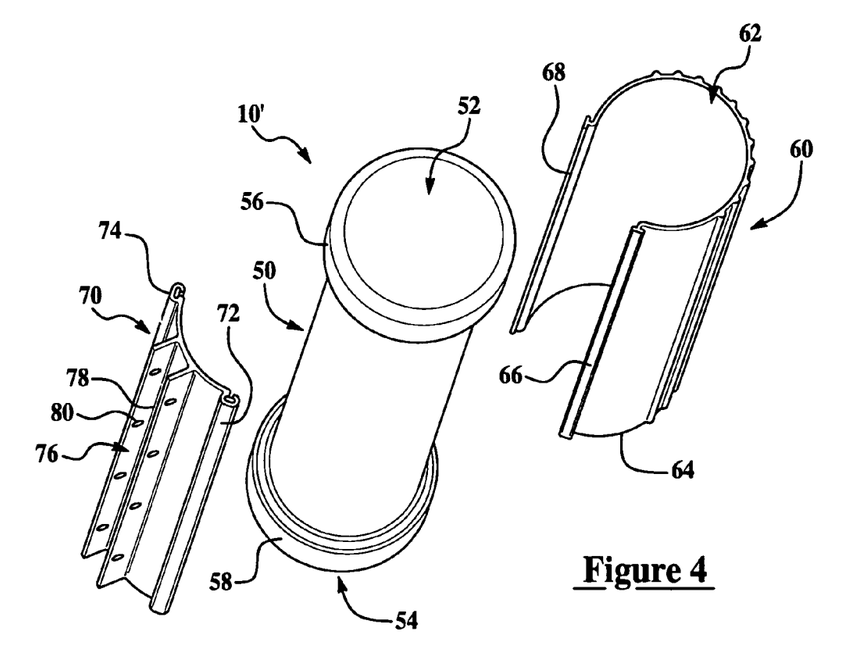
FIG. 4 illustrates an exploded view of a first alternative embodiment of the bumper system.

Referring now to FIG. 4, a first alternative embodiment 10' of the impact absorption device is illustrated having a preformed impact absorption member 50 having opposing ends 52 and 54. The absorption member 50 is formed of a resilient and durable material such as polyurethane foam. Alternatively, the absorption member 50 may be formed of a resilient polymer or rubber material having an interior volume adapted to be filled with compressed air rather than being filled with a solid preformed impact absorbent member.

A sleeve 60 having opposing ends is provided being formed of an extruded material dimensioned to cover the impact absorption member 50 as a protective shield. When the sleeve 60 is coupled to the preformed impact absorption member 50 as illustrated best in FIG. 5, the ends 62 and 64 of the sleeve 60 are covered by the dumbbell shaped ends 56 and 58 of the impact absorption member 50. In this manner, the rough edges 62 and 64 of the sleeve 60 will be guarded against causing cuts or scratches when used for domestic purposes. The sleeve 60 includes retaining edges 66 and 68 that are adapted to engage complementary portions of a flange 70 that is operative to be removably secured to the sleeve 60 and impact absorption member 50.

The flange 70 includes receiving channels 72 and 74 for receiving the retaining edges 66 and 68 of the sleeve 60 in slip fit or snap fit engagement for assembly. The sleeve 60 is coupled to the impact absorption member and thereafter the flange 70 is removably secured to the retaining edges 66 and 68 of the sleeve. Here the flange 70 is shown to include a bracket portion 76 whereby a mounting member may be attached thereto for securing the impact absorption device to a freestanding object such as a pylon or docking post. The bracket portion 76 includes a channel 78 and spaced apart apertures 80 formed in sidewalls of the channels for receiving fasteners that secure the mounting members that attach to the flange 70.

Figure 5:
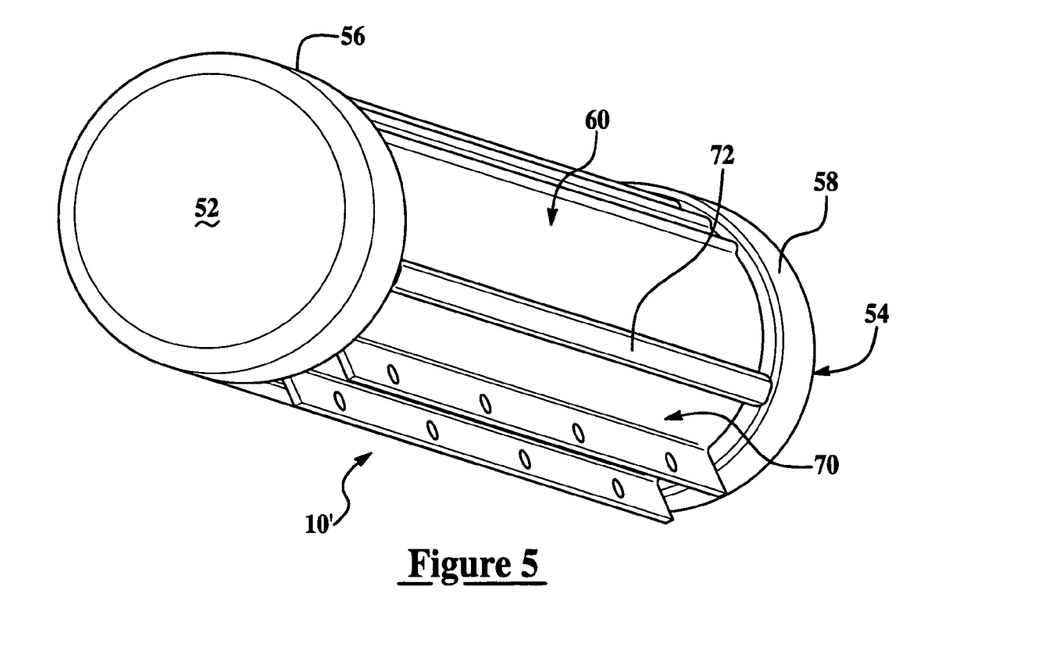
FIG. 5 illustrates a perspective view of the first alternative embodiment of the bumper system.

FIG. 5 illustrates an assembled perspective view of the alternative embodiment 10' of the impact absorption device as according to the invention whereby the dumbbell shaped ends 56 and 58 of the impact absorption member 50 shroud the opposing ends of the sleeve 60 such that the rough or rigid edges of the sleeve are guarded against causing scratching or other injury to users.

Figure 6:
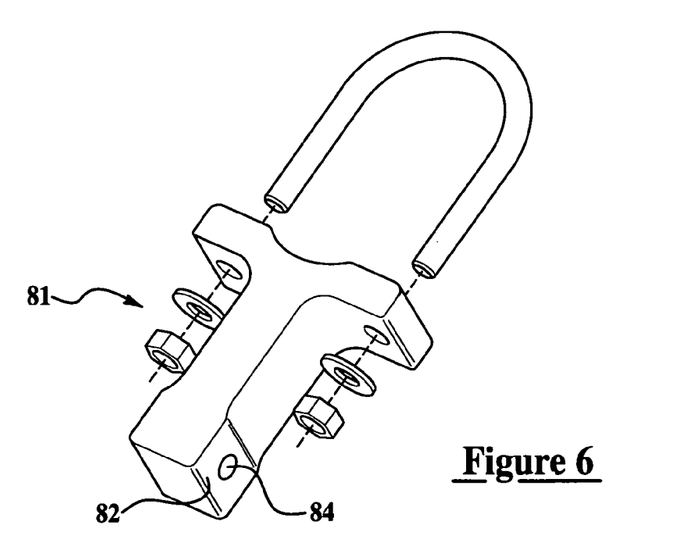
FIG. 6 illustrates the mounting member to be used with the first alternative embodiment of the bumper system.

FIG. 6 illustrates a mounting member 81 to be used with the flange 70 of the alternative embodiment 10' of the impact absorption device. The mounting member 81 includes an end 82 that is dimensioned to be received in the channel 78 of the bracket portion 76 described above. The end 82 of the mounting member 81 includes an aperture 84 that aligns with the apertures 80 formed in the bracket portion 76 when the mounting member 81 is coupled thereto for receiving an appropriate fastener for securing the two components together. The flange 70 and mounting member 81 are preferably formed of the same material such as a durable non-corrosive metallic material; however, it is appreciated that other materials such as PVC or other polymer type materials may be used without exceeding the scope of the invention.

Figure 7:
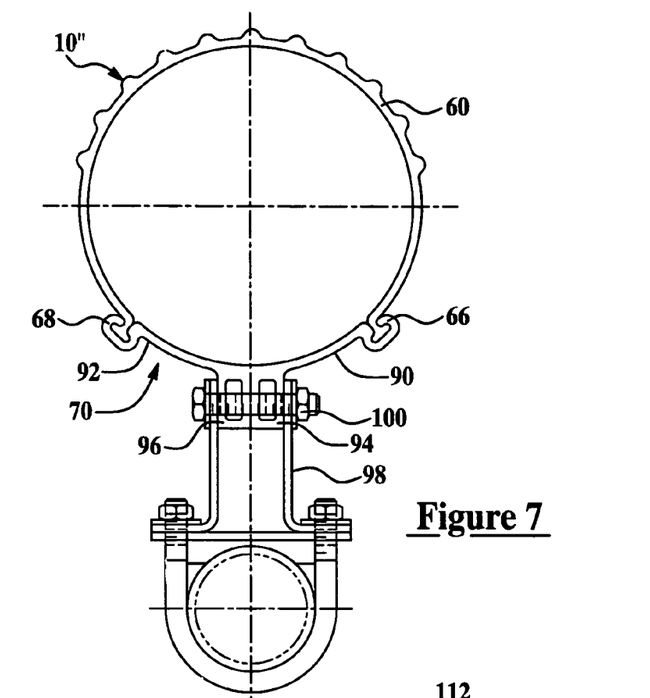
FIG. 7 is a cross-sectional view of the first alternative embodiment of the bumper system wherein the flange is provided in two symmetrical halves.

FIG. 7 illustrates a cross-sectional view of the second alternative embodiment 10" wherein the flange 70 is formed of two substantially symmetrical halves 90 and 92 which can be separately attached to the sleeve 60 at its retaining edges 66 and 68 as described above and ratcheted or wrenched together at free ends 94 and 96 for enclosing a preformed impact absorption member within the sleeve and flange accordingly. In this manner, off-the-shelf replacement impact absorption members may be used which differ slightly in circumferential area as a convenient option to original equipment. A fastener 102 is used to clamp the ends 92 and 94 of the flange 70 together in cooperation with the mounting member 98 such that the impact absorption device is made mountable to a standing object.

Figure 9:
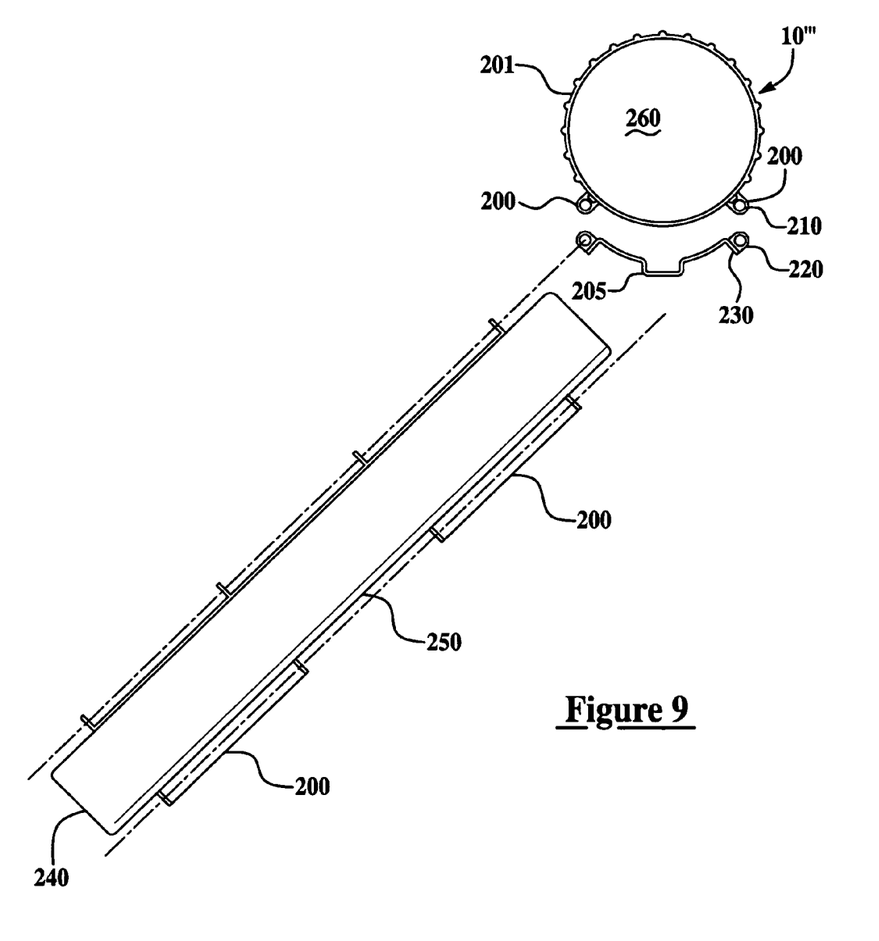
FIG. 9 is a cross sectional view of a third alternative embodiment of the bumper system.

FIG. 9 illustrates a third alternative embodiment 10''' of the bumper system wherein the impact absorption member 201 is a sleeve formed of an extruded material includes an exterior wall 250 that defines an interior volume 260. The interior volume 260 is adapted to be filled with an impact absorbent material. Preferably, the impact absorption member 201 is formed with an open end 240 for receiving a preformed impact absorption material such as a resilient polyurethane. It is appreciated that the absorption member 201 may also be filled with the absorbent material via an injection process known by skilled in the art. The exterior wall 250 of the absorption member 201 includes at least two one elongated and spaced apart fastening lobes 200. Each fastening lobe 200 includes a throughhole 210 dimensioned to receive an elongated fastener for attaching a flanged bracket 205 thereto. The flanged bracket 205 is formed with fastening tabs 220 dimensioned to align with the throughholes 210 of the absorption member 201 and receiving the elongated fasteners. The flanged bracket 205 is adapted to be coupled to a mounting member for attaching the impact absorption device 10''' to a piling or other standing structure.

Referring again to FIG. 4, the first alternative embodiment 10' may optionally be provided with end caps for capping the ends 62 and 64 of the sleeve 60 after attachment to the flange 70. In this manner the dumbbell shaped ends 56 and 58 of the impact absorption member 50 would not be required as the end caps would be sufficient for covering the opposing ends of the sleeve 62 and 64 to prevent scratching or injury. The end caps may be permanently secured to the sleeve during a manufacturing process and thereafter the interior volume of the sleeve may be filled with an impact absorption material such as a polyurethane foam or similar resilient and durable material suitable for such purpose.

From the foregoing an inventive bumper system or impact absorption device is provided for use in protecting a watercraft from damage during the docking process but also may provide utility in other environments such as industrial, residential and commercial. Having described the invention in detail, however, additional features and embodiments may become apparent to those skilled in the art without exceeding the scope of the present invention.

I claim:

1. An impact absorption device comprising:
   an impact absorption member formed of an extruded material, said impact absorption member extending along a longitudinal axis between opposing ends, said impact absorption member including an exterior wall having a generally circular shaped portion and a pair of end walls, said pair of end walls extending toward each other from opposite sides of said circular shaped portion, said exterior wall including a flanged portion having a center wall extending between a pair of generally parallel side walls, said flanged portion extending continuously between said center wall and said pair of end walls, said flanged portion extending to at least one of said opposing ends, the other of said opposing ends having a circular cross section;
   a mounting member for mounting said impact absorption member to an object to be protected from direct impact; and
   a bracket coupled to said mounting member, said bracket having a back wall and a pair of arms defining an opening to allow insertion of said flange portion therebetween in a direction generally normal to said longitudinal axis of said absorption member.

2. The device of claim 1 wherein said exterior wall of said absorption member includes a plurality of elongated lobes operative to reduce surface friction upon impact with the device.

3. The device of claim 1 wherein said exterior walls defines an interior volume filled with an impact absorbent material.

4. The device of claim 3 wherein said impact absorbent material is formed of polyurethane.

5. The device of claim 1 wherein said bracket is adapted to be removably secured to a plurality of impact absorption members.

6. The device of claim 1 wherein said mounting member attaches to the object at an end having an indentation that is complementary to a surface of the object.

7. An impact absorption device comprising:
   an impact absorption member formed of an extruded material, said impact absorption member extending along a longitudinal axis between opposing ends, said impact absorption member including an exterior wall having a generally circular shaped portion and a pair of end walls, said pair of end walls extending toward each other from opposite sides of said circular shaped portion, said exterior wall including a flanged portion having a center wall extending between a pair of generally parallel side walls, said flanged portion extending continuously between said center wall and said pair of end walls, said center wall having spaced apart notches formed substantially perpendicular to a longitudinal axis of said impact absorption member and wherein said sidewalls have spaced apart apertures formed therein substantially perpendicular to said longitudinal axis;
   a mounting member for mounting said impact absorption member to an object to be protected from direct impact; and
   a bracket coupled to said mounting member, said bracket having a back wall and a pair of arms defining an opening to allow insertion of said flange portion therebetween in a direction generally normal to said longitudinal axis of said absorption member.

* * * * *